PILOT PULSE SYSTEM FOR MONOPULSE COMPARATOR
Filed July 10, 1953
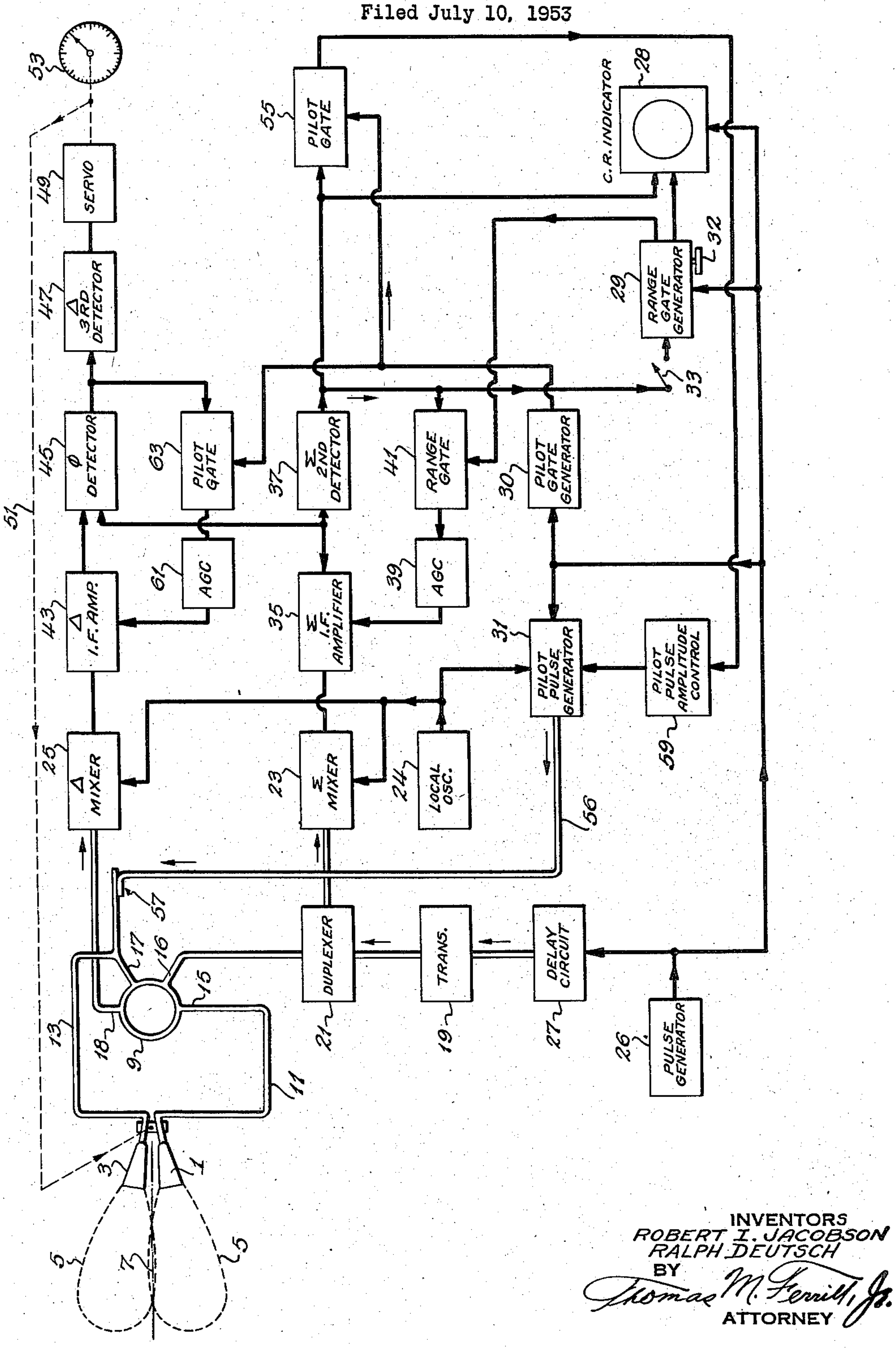
INVENTORS
ROBERT I. JACOBSON
RALPH DEUTSCH
BY Thomas M. Ferrill, Jr.
ATTORNEY 2,881,423
Patented Apr. 7, 1959

2,881,423

PILOT PULSE SYSTEM FOR MONOPULSE COMPARATOR

Robert I. Jacobson, Kew Gardens Hills, N.Y., and Ralph Deutsch, Inglewood, Calif., assignors to Sperry Rand Corporation, a corporation of Delaware Application July 10, 1953, Serial No. 367,253

7 Claims. (Cl. 343—7.3)

This invention relates to improvements in automatic gain control systems, and more particularly to systems for controlling the gain of one amplifier in accordance with the gain of another amplifier to maintain said gains substantially equal, or in a constant ratio to each other, independently of variations in the gain of said other amplifier. One important use for such systems is in tracking radars of the "monopulse" or simultaneous lobing type, wherein directional error information is obtained by comparison of the outputs produced in response to a reflected signal by two antenna elements having directive patterns that overlap to define an equisignal axis.

One of the principal objects of the invention is to provide gain control systems of the above mentioned type that will maintain the desired relationship between the gains of two amplifiers throughout a wide range of gain variation, for example 80 db or more. Another object is to provide gain control systems of the foregoing type wherein the accuracy of operation is substantially unaffected by normal variations in the characteristics of the component parts, such as those caused by tube aging.

A further object is to provide a dual-channel radio receiver system with means to control the gain of both channels alike in response to the amplitude of the input to one of the channels, independently of the input to the other channel and independently of relatively large incidental differences between the gain control characteristics of the respective channels.

The invention will be described with reference to the accompanying drawing, which is a schematic block diagram of a simultaneous lobing pulse radar arranged to track automatically in azimuth, and embodying the invention in a presently preferred form.

The particular radar shown in the drawing is given only by way of example and to serve as a setting for the description of the automatic gain control system. It includes generally a transmitter, an antenna system and two receivers constituting sum and difference channels, respectively designated hereinafter as Σ and Δ.

The antenna comprises two directive elements such as horns 1 and 3, mounted for rotation in azimuth but fixed in relationship to each other so that their directive patterns overlap as indicated by the dotted lines 5, to define an equisignal axis 7. The horns 1 and 3 are connected to a hybrid network 9 by wave guides 11 and 13 that are preferably equal in length.

In the present example, the hybrid network 9 is a so-called "rat-race," comprising a wave guide with its ends connected together to form a closed ring. The length of this wave guide is one and one half times the operating wavelength of the system, and it is provided with four terminals 15, 16, 17 and 18, spaced at quarter wavelength intervals, leaving a three-quarter wavelength interval between terminals 18 and 15. Terminals 15 and 17 are conjugate with respect to each other, and terminals 16 and 18 are also conjugate with respect to each other.

The horns 1 and 3 are connected to terminals 15 and 17 respectively. The transmitter 19 is connected, through a duplexer or T-R box 21, to the terminal 16. The receiver terminal of the duplexer 21 is connected to a mixer 23, which constitutes the first stage of the Σ channel receiver. The hybrid network terminal 18 is connected to a mixer 25, which is the first stage of the Δ channel receiver. A common local oscillator 24 is coupled to both mixers 23 and 25.

With the described connections, output from the transmitter 19 reaches both horns 1 and 3 equally and in phase, and is radiated thereby in a beam that is produced by the combination of the directive patterns, and is symmetrical with respect to the axis 7. The outputs provided by the horns 1 and 3 in response to reflected radiation that is received are combined in the network 9 to produce a signal at the terminal 16 corresponding to their sum, and a signal at the terminal 18 corresponding to their difference.

When a reflection is received from a point on the axis 7, the difference or Δ signal is zero. The amplitude of the sum or Σ signal depends on the strength of the reflection. When a reflection is received from a point that is off the axis 7, but within the overall directive pattern, the Σ signal will still depend substantially only upon the strength of the reflection. However, the amplitude of the Δ signal will depend both on the strength and on the deviation in the direction of the reflection from the axis 7. Also, the phase relationship of the Δ signal to the Σ signal will depend upon the sense of the deviation; the phase of the Δ signal in response to a reflection from one side of the axis 7 is reversed with respect to that in response to a similar reflection from the other side of the axis.

A pulse generator 26 supplies periodic pulses for modulating or controlling the modulation of the transmitter 19, and for synchronizing range and pilot gate generators 29 and 30 and a pilot pulse generator 31, to be described. The pulse generator 26 is also connected to synchronize the sweep of a cathode ray indicator 28. A delay circuit 27 may be included in the connection from the pulse generator 26 to the transmitter, or an equivalent delay means may be provided in a modulator circuit forming part of the transmitter.

The range gate generator 29 is triggered by each pulse from the generator 26 to provide a range gate pulse that is delayed with respect to the corresponding pulse as transmitted by the transmitter 19, by an amount that can be initially adjusted manually, by a handwheel 32, to correspond to the delay of pulses received from a selected target that is to be tracked. The range gate pulse and the target pulses are shown on the indicator 28. When the gate pulse coincides with the desired target pulse, the range gate generator is connected to the Σ receiver by closing a switch 33, and thereafter, as long as that particular target is being tracked, it is controlled by the pulses received from that target to produce range gate pulses substantially coincident with said received pulses. The details of such range gate generators are well known to those skilled in the art and need not be described here.

The pilot gate generator 30 produces pulses like the range gate, but their timing is fixed with respect to the pulses from the generator 26. Owing to the delay circuit 27, the pilot gate pulse precedes each transmitted pulse by a short interval.

The Σ channel receiver includes, following the mixer 23, an intermediate frequency amplifier 35 and a second detector 37. This receiver is also provided with an automatic gain control circuit 39, including suitable rectifier and filter means connected to the second detector 37 to produce a D.-C. control voltage for adjusting the gain of the amplifier 35, to maintain the amplitude of the detector output substantially constant throughout a wide range of variation in the amplitude of the received signal. However, the connection between the detector 37 and the automatic gain control circuit includes a range gate circuit 41. The gate circuit 41 may comprise an amplifier that is normally biased to cutoff, but is rendered operative momentarily by each range gate pulse applied to it from the generator 29. With this arrangement, the gain of the amplifier 35 is controlled only by the strength of signals received from the selected target, and is not affected by other, non-coincident signals.

The Δ channel receiver includes an I.F. amplifier 43 like the amplifier 35 in the Σ receiver. Incidentally, it is noteworthy that although the amplifiers 35 and 43 may be as nearly identical as it is possible to make them, their gain control characteristics may differ widely. It has been found in practice that two such amplifiers, with the same control voltage applied, can differ in gain by as much as 20 db. The output of the amplifier 43 goes to a phase detector 45. The reference phase input circuit of the detector 45 is connected to the Σ channel I.F. amplifier 35.

The phase detector 45 produces output pulses that are positive-going or negative-going, according to the phase relationship between the Σ channel and Δ channel I.F. inputs to it. The amplitude of these output pulses depends upon the amplitudes of the inputs. The Σ input resulting from the target echo signals is substantially constant, owing to the action of the Σ channel automatic gain control system. Therefore the amplitude of the phase detector output will vary substantially only with variations in amplitude of the output of the Δ channel I.F. amplifier 43.

The phase detector output is supplied to a third detector 47, which converts the pulses to a voltage for controlling a servo system 49. By way of example, the third detector 47 may be designed in known manner to produce a D.-C. output having a magnitude that corresponds closely to the amplitude of the input pulses, and having a polarity that depends on whether the pulses are positive-going or negative-going. The servo 49 is mechanically coupled, as schematically indicated by the dash line 51, to the supporting means for the horns 1 and 3. The connections are made so that any output from the Δ channel, resulting from angular deviation between the axis 7 and the direction of the selected target, will energize the servo to rotate the horn assembly in the direction to reduce the deviation. Thus the equisignal axis 7 is automatically and continuously directed substantailly at the selected target. The direction may be indicated by means 53 coupled to the shaft 51.

The range of intensities of target-reflected signals with which the tracking system is required to operate may be very wide, because the selected target may be nearby, large, and highly reflective, or very distant and poorly reflective. For the servo system to operate properly, it is necessary that the angular sensitivity, i.e. the output of the Δ channel in volts per degree of angular deviation, be approximately constant. Therefore it is necessary that the gain of the Δ channel I.F. amplifier 43 be controlled like that of the Σ channel amplifier 35.

This cannot be done as it is in the Σ channel, by using the target pulse output of the second detector, because the target pulse signal in the Δ channel depends on the angular deviation. The amplifier 43 cannot be controlled satisfactorily by simply connecting it to the Σ channel automatic gain control circuit 39 because, as mentioned before, the gain of the amplifier 43 could still differ by as much as 20 db from a value corresponding to that of the amplifier 35.

In the present system the gain of the Δ channel amplifier 43 is controlled in response to pilot pulses from the generator 31, which occur during the "dead" time between the end of each range sweep and the beginning of the next. The pilot pulses are of the same radio frequency as the transmitter 19, but are automatically controlled in amplitude according to the strength of the reflected signals received from the target that is being tracked.

The pilot pulse generator 31 may consist of an intermediate frequency oscillator modulated or triggered by the pulse generator 26, and means for mixing its output with that of the local oscillator 24 to produce output pulses of the operating radio frequency. The mixer device may be a two-resonator klystron, with its input resonator tuned to the local oscillator frequency and its output resonator tuned to the desired sideband, i.e. the transmitter frequency. The I.F. modulation may be applied to this klystron in any convenient manner, as by variation of the accelerating potential.

The foregoing details of the pilot pulse generator 31 are given by way of example only; various other arrangements for providing the desired pilot signals will be apparent to those skilled in the art. The R.F. output of the generator 31 is supplied through a wave guide 56 and a directional coupler 57 to the terminal 17 of the hybrid network 9. This connection makes the pilot signal appear in the same amplitude at the inputs of the Σ and Δ mixers 23 and 25. Alternatively, the pilot pulse could be supplied to the terminal 15. The result would be the same, but the polarity of the Δ channel automatic gain control system would have to be reversed, as will be described.

The pilot pulse amplitude may be controlled by varying the amplitude of the I.F. modulation that is mixed with the local oscillator signal to produce the pilot signal; this can be effected by means of a variable gain I.F. amplifier between the I.F. oscillator and the klystron. The control signal for this purpose is derived from the output of the Σ channel second detector 37. The detector 37 is connected through a pilot gate circuit 55 to the pilot pulse amplitude control circuit 59, which may be a rectifier-filter combination similar to the Σ channel automatic gain control circuit 39. The pilot gate circuit 55 is like the range gate 41, except that it is connected to and controlled by the pilot gate generator 30.

The above described arrangement regulates the pilot pulse generator solely in response to the pilot pulse output of the Σ channel detector 37, maintaining said detector output substantially constant in amplitude at a value that is determined by the design of the pilot pulse generator 31 and its control circuit 59. Thus the pilot pulse generator output amplitude will be inversely proportional to the gain of the Σ channel receiver. Since this gain is controlled in response to the selected echo pulses to provide a constant amplitude echo pulse output from the detector 37, the pilot pulses from the generator 31 will bear a constant amplitude ratio to the received echo pulse. This ratio is the same as the ratio of pilot pulse to echo pulse at the output of the detector 37, and depends on the design of the amplifier 35, the pilot pulse generator 31, and their associated control circuits 39 and 59. It may be made to have any reasonable value, for example unity.

The Δ channel intermediate frequency amplifier 43 is provided with an automatic gain control circuit 61 like the Σ channel gain control circuit 39, but connected to the output of the phase detector 45 through a pilot gate circuit 63. The gate circuit 63 is connected to the pilot gate generator 30, and is controlled thereby to permit only the pilot signal output of the detector 45 to reach the automatic gain control 61.

The polarity of the pilot signal output from the phase detector 45 will depend upon which of the terminals 15 and 17 of the hybrid network 9 is connected to the pilot pulse generator 31. The pilot gate 63 and automatic gain control 61 may be designed to operate with either polarity, by including a phase inverter stage, if necessary, between the detector 45 and the gate circuit 63. In any event the connections are made so that an increase in amplitude of the pilot signal output from the detector 45 will decrease the gain of the amplifier 43, and vice versa.

Thus the gain is automatically controlled to maintain the pilot pulse output of the phase detector 45 at a substantially constant amplitude. This requires that the gain of the amplifier 43 be inversely proportional to the amplitude of the pilot pulse at the input to the Δ channel. Since this input amplitude bears a fixed ratio to that of the received echo pulse, as described before, the gain of the Δ channel must vary inversely with variations in the echo pulse amplitude in exactly the same maner as the gain of the Σ channel varies. This makes the echo pulse output of the phase detector 45 independent of the strength of the reflected echo signal, and dependent only on the deviation of the equisignal axis 7 from the direction of arrival of the echo pulse.

While the invention has been described as incorporated in a particular type of radar system, it will be apparent that its use is not limited thereto, nor is the embodiment thereof restricted to the particular form shown. The described gain control system or its equivalent may be extended to a three coordinate system (range, azimuth, and elevation) for instance, by simply duplicating the pilot controlled automatic gain control system for the additional Δ channel.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A radio receiver system including two antenna elements having directive patterns that overlap to define an equisignal axis, first and second receivers, means connecting said antenna elements in additive relationship to each other to said first receiver and in subtractive relationship to each other to said second receiver, an automatic gain control circuit connected to said first receiver and including means to prevent its response to any signals except a selected one whose direction of arrival is to be determined, a pilot signal generator for producing a signal that is different from said selected signal and hence cannot affect said automatic gain control circuit, means coupling said pilot signal generator to both said receivers to provide substantially equal pilot signal inputs thereto, means for controlling the amplitude of said pilot signal, said last mentioned means being connected to said first receiver to adjust the amplitude of said pilot signal in response to the amplitude of the pilot signal output of said first receiver to maintain said pilot signal output amplitude substantially constant, and an automatic gain control circuit connected to said second receiver and including means to prevent its response to any signals except said pilot signal.

2. A plural channel signal system including a first amplifier and at least one further amplifier, each of said amplifiers having input terminals adapted to be connected to a respective source of signals to be amplified, and output terminals adapted to be connected to respective utilization means for supplying amplified signals thereto, a pilot signal generator for producing a pilot signal having a distinguishing characteristic, said generator being coupled to the input terminals of said amplifiers, an automatic gain control circuit for said first amplifier including means coupled to the output terminals of said first amplifier and means to reject said pilot signal and prevent operation of said automatic gain control circuit by said pilot signal, an amplitude control circuit connected to said pilot signal generator for controlling the amplitude of said pilot signal and having control signal input terminals, means coupling said control signal input terminals to the output terminals of said first amplifier, said last mentioned means including means to reject all signals except the pilot signal output of said first amplifier; and an automatic gain control circuit for each of said further amplifiers including means coupled to the output terminals of the respective further amplifier and means to reject all signals except the pilot signal output thereof.

3. A simultaneous lobing radar system including two antenna elements having directive patterns that overlap to define a principal directive axis, a hybrid network connected to said antenna elements and having two output terminals for providing outputs that correspond respectively to the sum and to the difference of signals received by said antenna elements, first and second receivers connected respectively to the sum and difference output terminals of said network, and a pulse transmitter adapted to radiate along said directive axis; a range gate generator for producing gate pulses that coincide substantially with the reception of pulses from said transmitter after reflection from objects at a selected range, said range gate generator including means for varying the delay of said gate pulses with respect to that of the pulses from said transmitter to select said range; an automatic gain control circuit connected to said first receiver and to said range gate generator to adjust the gain of said first receiver in accordance with the magnitude of the sum signals produced by the selected reflected pulses; a pilot pulse generator for producing pilot pulses outside the interval through which the timing of said range gate pulses may be varied, said pilot pulse generator being coupled to said hybrid network to provide identical input signals to said receivers, said pilot pulse generator including pilot pulse amplitude control means connected to said first receiver and responsive to the pilot pulse output thereof to adjust the amplitude of the output of said pilot pulse generator to a value corresponding to the amplitude of said selected sum signal; an automatic gain control circuit connected to said second receiver and including a gate circuit and means for opening said gate circuit coincidentally with said pilot pulse to make said automatic gain control responsive solely to said pilot pulse to adjust the gain of said receiver to provide pilot pulse output of substantially constant amplitude, whereby the gain of said second receiver is maintained in a substantially constant ratio to the gain of said first receiver, range indicator means connected to said first receiver, and utilization means connected to said second receiver and responsive to the amplitude of the output thereof according to the angular deviation of said directive axis from a reflecting object.

4. A plural channel signal system including at least two amplifiers, an automatic gain control circuit connected to one of said amplifiers and including means to prevent its response to any signals except a selected one, a pilot signal generator for producing a signal that is different from said selected signal and hence cannot affect said automatic gain control circuit, means coupling said pilot signal generator to all of said amplifiers to provide substantially equal pilot signal inputs thereto, means for controlling the amplitude of said pilot signal, said last mentioned means being connected to said first amplifier to adjust the amplitude of said pilot signal in response to the amplitude of the pilot signal output of said first amplifier to maintain said pilot signal output amplitude substantially constant, and an automatic gain control circuit connected to each of the others of said amplifiers and including means to prevent its response to any signals except said pilot signal.

5. A pilot signal control system including an amplifier having input terminals adapted to be coupled to a source of signals to be amplified, and output terminals adapted to be coupled to utilization means for supplying amplified signals thereto; a pilot signal generator having output terminals connected to the input terminals of said amplifier to thereby maintain said last mentioned amplitude control circuit coupled to the output terminals of said amplifier and responsive only to the amplitude of the pilot signal output of said amplifier to control the amplitude of the output of said pilot signal generator inversely as the amplitude of the pilot signal output of said amplifier to thereby maintain said last mentioned amplitude approximately constant substantially independently of any variations in the gain of said amplifier; and an automatic gain control circuit connected to said amplifier to control its gain inversely as the amplitude of a selected component of its output, said gain control circuit including means for rejecting the pilot signal output of said amplifier, whereby the amplitude of the output of said pilot signal generator is maintained in a substantially constant ratio to the amplitude of a selected signal at the input terminals of said amplifier.

6. A plural channel pulse signal system including a first amplifier and at least one further amplifier, each of said amplifiers having input terminals adapted to be connected to a respective source of input pulses to be amplified, and output terminals adapted to be connected to respective utilization means for supplying amplified pulses thereto, a pilot signal generator coupled to the input terminals of said amplifier, a pilot pulse generator for producing pulses that are distinguishable from said input pulses, said pulse generator being connected to said pilot signal generator to modulate said pilot signal, an automatic gain control circuit for said first amplifier including means coupled to the output terminals of said first amplifier and a gate circuit to reject the pilot signal output of said amplifier and prevent operation of said automatic gain control circuit by said pilot signal, an amplitude control circuit connected to said pilot signal generator for controlling the amplitude of said pilot signal and having control signal input terminals, means coupling said control signal input terminals to the output terminals of said first amplifier, said last mentioned means including a gate circuit connected to said pilot pulse generator and controlled thereby to reject all signals except the pilot signal output of said first amplifier; and an automatic gain control circuit for each of said further amplifiers including means coupled to the output terminals of the respective further amplifier and a gate circuit connected to said pilot pulse generator and controlled thereby to reject all signals except the pilot signal output of the respective further amplifier.

7. A simultaneous lobing radar system including a directional channel receiver, a range channel receiver, and a pulse transmitter; a range gate generator for producing gate pulses that coincide substantially with the reception of pulses from said transmitter after reflection from objects at a selected range, said range gate generator including means for varying the delay of said gate pulses with respect to that of the pulses from said transmitter to select said range; an automatic gain control circuit connected to said range channel receiver and to said range gate generator to adjust the gain of said range channel receiver solely in accordance with the magnitude of the input thereto produced by the selected reflected pulses; a pilot pulse generator for producing pilot pulses outside the interval through which the timing of said range gate pulses may be varied, said pilot pulse generator being coupled to both said receivers to provide identical input signals to said receivers, said pilot pulse generator including pilot pulse amplitude control means connected to said range channel receiver and responsive solely to the pilot pulse output thereof to adjust the amplitude of the output of said pilot pulse generator to a value corresponding to the amplitude of said selected signal at the input to said range channel receiver; and an automatic gain control circuit connected to said directional channel receiver and responsive solely to said pilot pulse to adjust the gain of said directional channel receiver to provide pilot pulse output of substantially constant amplitude, whereby the gain of said directional channel receiver is maintained in a substantially constant ratio to the gain of said range channel receiver.

No references cited.

UNITED STATES PATENT OFFICE

CERTIFICATE OF CORRECTION

April 7, 1959

Patent No. 2,881,423

Robert I. Jacobson et al.

It is hereby certified that error appears in the printed specification of the above numbered patent requiring correction and that the said Letters Patent should read as corrected below.

Column 3, line 18, before "control" insert -- gain --; lines 49 and 50, for "substantailly" read -- substantially --; column 6, line 73, strike out "to thereby maintain said last mentioned" and insert instead --, said pilot signal generator including an --.

Signed and sealed this 1st day of March 1960.

(SEAL)
Attest:

KARL H. AXLINE
Attesting Officer

ROBERT C. WATSON
Commissioner of Patents